Nov. 30, 1937.   C. O. LAVETT   2,100,444
ROTARY DRIER
Filed Oct. 24, 1936   4 Sheets-Sheet 2

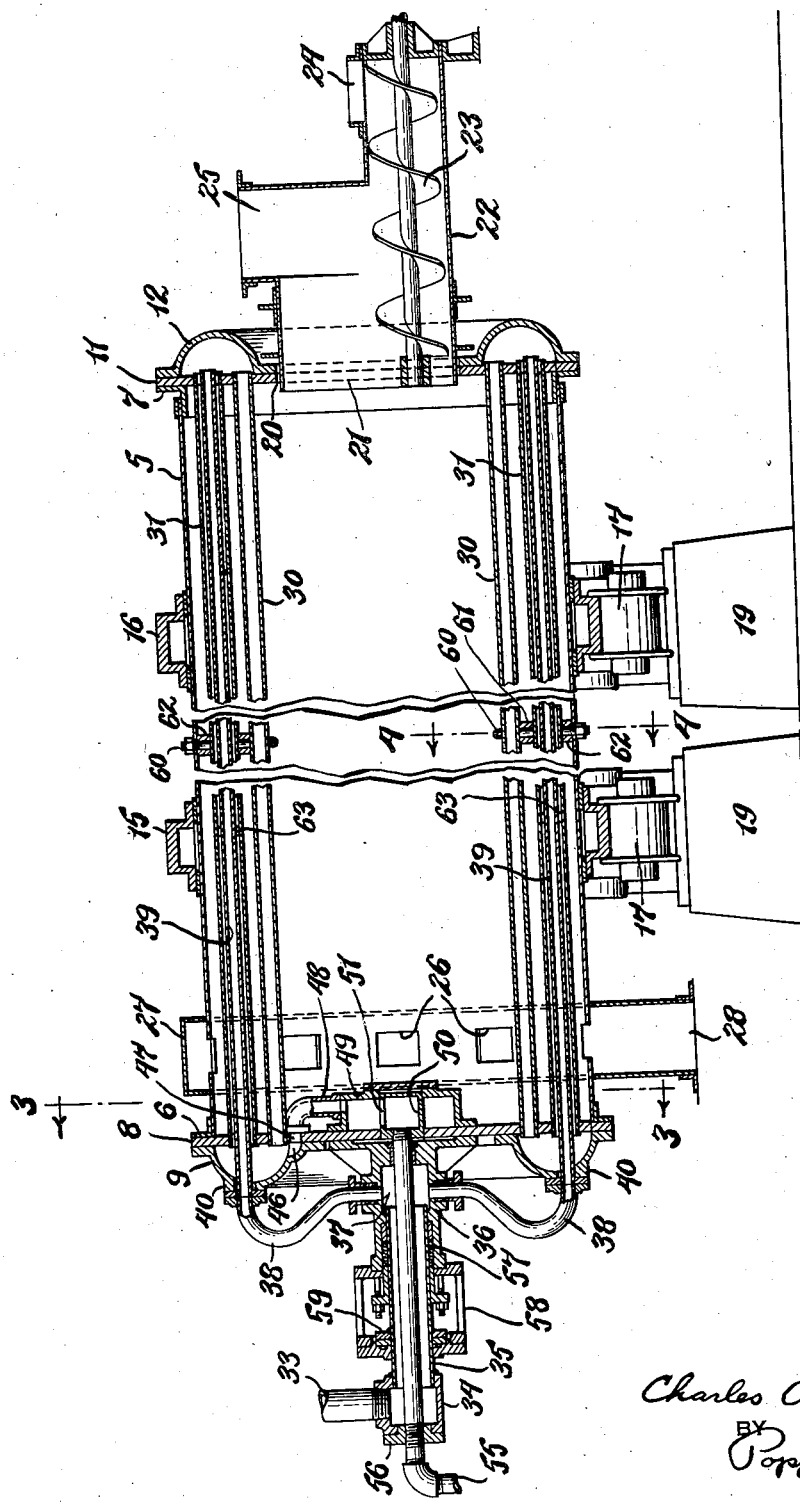

INVENTOR
Charles O. Lavett
BY
Popp and Popp
ATTORNEYS

Nov. 30, 1937.     C. O. LAVETT     2,100,444
ROTARY DRIER
Filed Oct. 24, 1936     4 Sheets-Sheet 3

INVENTOR
Charles O. Lavett
BY
Pojep and Pojep
ATTORNEYS

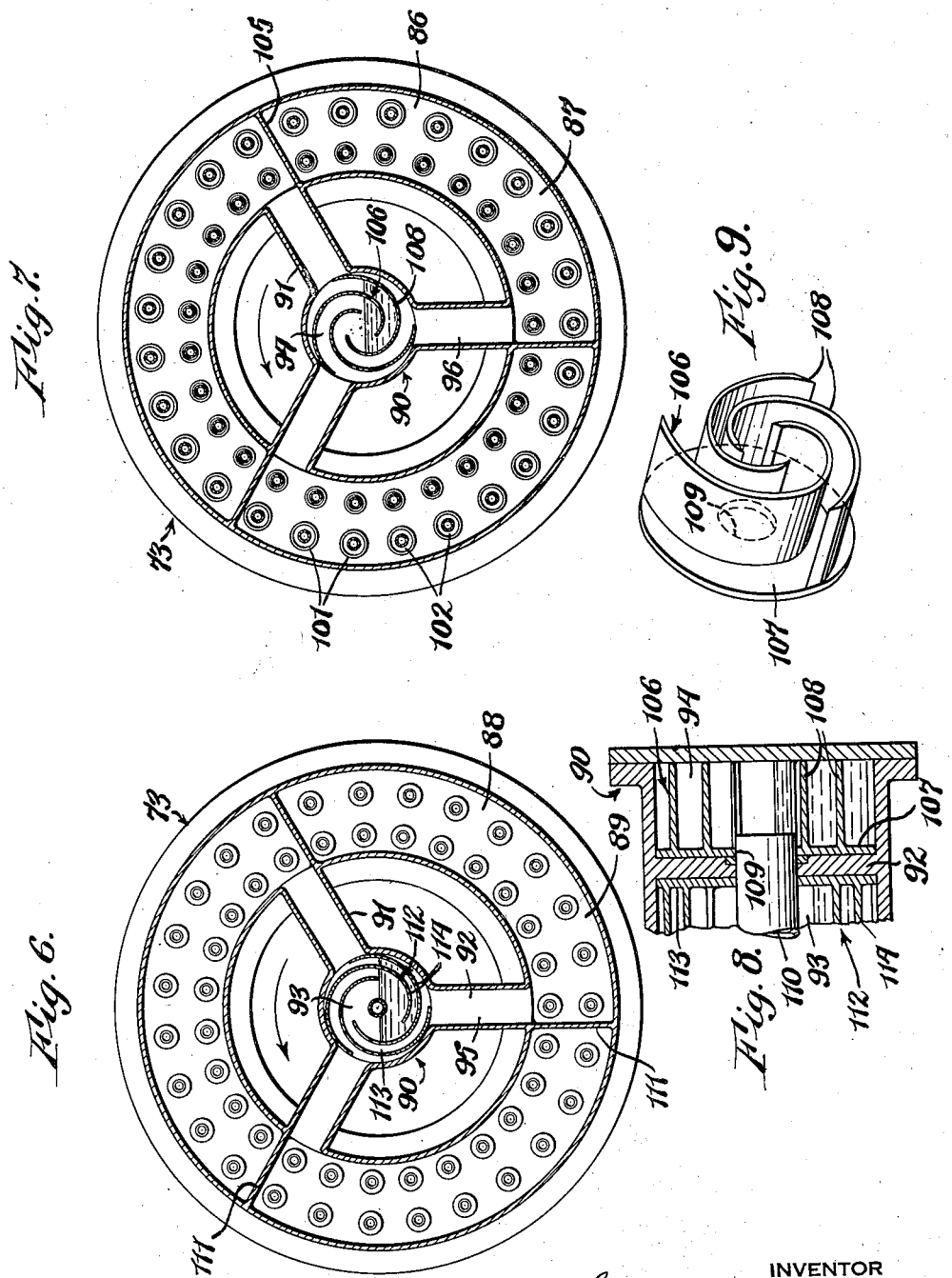

Patented Nov. 30, 1937

2,100,444

UNITED STATES PATENT OFFICE 2,100,444

ROTARY DRIER

Charles O. Lavett, Buffalo, N. Y., assignor to Buffalo Foundry & Machine Co., Buffalo, N. Y., a corporation of New York Application October 24, 1936, Serial No. 107,463

7 Claims. (Cl. 257—93)

This invention relates to a rotary drier and more particularly to a tubular drier comprising a cylindrical rotary shell arranged on an inclined axis and having an inlet through the center of its upper end head for the materials to be dried and an outlet at its lower end and containing a series of pipes arranged in an annular row through which steam is passed for heating the materials tumbled around in the shell, the materials being in direct contact with the tubes.

In tubular rotary driers of this general character the materials are introduced and vapors from the drying materials are exhausted through one end head of the shell and the steam is introduced and the condensate withdrawn through the opposite end head of the shell. In tubular rotary driers as heretofore constructed the steam entering through the lower end head was immediately distributed to the various tubes so that the flow of the steam and materials in the drier was counter-current and the flow of condensate likewise counter-current to the steam flow. In such driers air and other non-condensible gases would collect at the materials inlet or upper head of the drier and if the tubes were not separately vented became air-bound.

The present invention proposes to provide such a tubular drier in which the steam is admitted through and condensate and air and non-condensible gases removed from the lower end head and in which the steam is directly conducted to the opposite end head and there distributed to the tubes so that the flow of materials, condensate, steam and air through the tubes is all concurrent and so that the steam sweeps the air and non-condensible gases back to the lower end head where they pass out with the condensate. Further, by effecting a concurrent flow of the steam, condensate and non-condensible gases, a more rapid steam flow is obtained and a better heat transfer is secured.

Another object is to provide a simple condensate discharge in the form of an insert having screw or spiral vanes for lifting the condensate to the central point of discharge.

Other objects of the present invention are to provide such a tubular rotary drier which is simple and inexpensive in construction and will stand up under conditions of severe and constant use without getting out of order.

In the accompanying drawings:

Fig. 1 is a vertical longitudinal fragmentary section of one form of tubular rotary drier embodying my invention.

Figs. 6 and 7 are vertical cross sections, taken along the correspondingly numbered lines on Fig. 5.

Fig. 8 is an enlarged fragmentary view similar to Fig. 5 and illustrating the condensate discharge.

Fig. 9 is a perspective view of one of the spiral condensate heads used to discharge the condensate.

Figure 3:
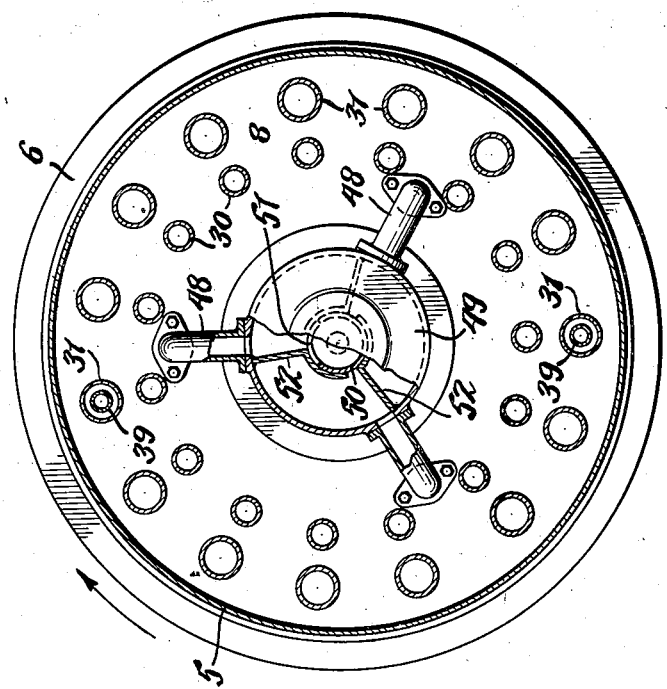
Fig. 3 is a vertical section, taken on line 3—3, Fig. 1.
Figure 4:
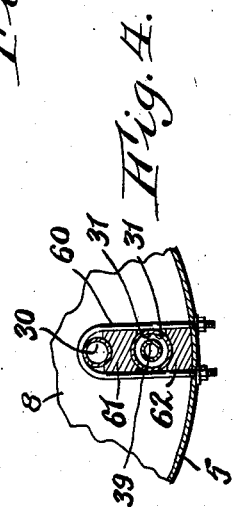
Fig. 4 is a fragmentary vertical section, taken on line 4—4, Fig. 1.

In the form of the invention shown in Figs. 1-4 the body of the tubular rotary drier comprises a cylindrical shell 5 which is provided in any suitable manner with flanges 6 and 7 the flange 7 having a sliding fit on the shell 5. The flange 6 is secured to the circular tube sheet 8 to the opposite side of which an annular header 9 is secured. Similarly, the flange 7 is secured against the inner face of a circular tube sheet 11 and an upper manifold or header 12 is secured to the outer side of the circular tube sheet 11.

The body is adapted to be rotated about its axis and for this purpose a pair of annular tracks 15 and 16 are secured to the outside of the cylindrical shell and supported by rollers 17 from a base 19 which can be of any usual and well known construction. The body is supported so that its axis is inclined, the header 12 being higher than the header 9 and the body is adapted to be continuously rotated by any suitable form of drive (not shown). The upper tube sheet 11 and header 12 are formed to provide a large central axial opening 20 into which the open end 21 of a non-rotating casing 22 extends. In the lower part of the casing 22 a feed screw 23 is journaled, this screw conducting the materials from a materials inlet opening into the interior of the rotary body of the drier. The vapors generated by the drying processes pass through the open end of the casing 22 and out through a vapor outlet 25. The opposite end of the cylinder 5 is provided with an annular row of outlet openings 26 through which the materials drop after traversing the length of the body of the drier and being dried therein. The materials discharged through the openings 26 are collected in an annular trough 27 which embraces the cylindrical shell 5 and is formed at its lower end with an outlet 28 for the dried materials. The trough 27 extends completely around the cylindrical shell 5 to minimize the amount of air drawn into the drier through the openings 26 by the suction applied to the opening 25 by a stack (not shown) or by other means for removing the vapors, and also to confine any dust rising from the materials.

An inner annular row of tubes 30 and an outer annular row of tubes 31 extend between the tube sheets 8 and 11. The sliding fit between the shell 5 and flange 7 permits expansion and contraction of the tubes 30 and 31.

Steam is supplied to the tubes and headers from a stationary steam pipe 33 which connects with a fitting 34, this fitting 34 being coaxial with the body of the drier and conducting the steam to a co-axial tube 35 which is welded to the fitting 34 or secured thereto in any suitable manner. At its opposite end the tube 35 is journaled in a distributing head 36 which is preferably bolted to the tube sheet 8 and has a chamber 37 therein into which the steam is discharged. This steam is conducted by two pipes 38 to a pair of tubes 39 each of which extends through the center of two of the outer series of heating tubes 31. For this purpose a pair of bosses 40 are formed in the header 9 and the pipes 38 and tubes 39 are secured therein so that the steam from the pipes 38 is led directly into the tubes 39 which conducts the steam directly to the opposite header 12 in which the steam is distributed to all of the tubes 30 and 31, through which the steam flows concurrent with the materials being dried and sweeps along the condensate and air or other non-condensible gases back to the header 9. The only flow of steam countercurrent to the materials is in the tubes 39 which are, of course, jacketed by the two tubes 31 in which they are housed.

Figure 2:
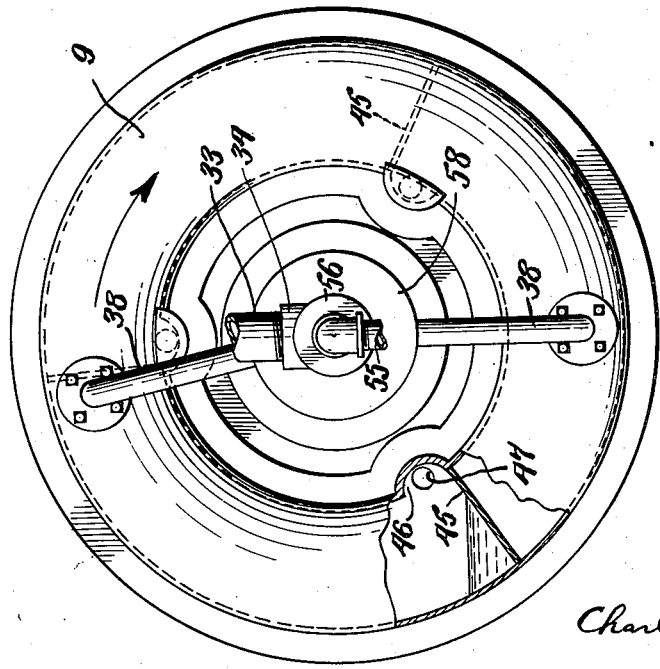
Fig. 2 is an end elevation thereof.

The interior of the header 9 is divided into three spaces by radial partitions 45, each of which is arranged to one side of a pocket 46 provided in the header, as best illustrated in Figs. 1 and 2. As the body of the drier rotates in the direction of the arrows, Figs. 2 and 3, the condensate collecting in the header 9 is lifted by the rising partition 45 and dropped into the corresponding pocket 46. Each of these pockets is provided with an outlet opening 47 which conducts the condensate to a corresponding outlet elbow 48, these outlet elbows 48 discharging into a cylindrical manifold 49 which is secured to the inner face of the tube sheet 8 and arranged coaxial therewith. Journaled in the condensate manifold 49 is a cylindrical hollow hub 50 having an inlet opening 51 in its top. The condensate collecting in the manifold 49 is lifted by radial partitions 52 from the interior of this manifold and discharged into the opening 51, as best illustrated in Fig. 3. To the hub 50 is secured a condensate outlet line 55 which extends through the steam inlet tube 35 and fitting 34 and out through a plug 56 in the end of the fitting 34, as illustrated in Fig. 1. The air or other non-condensible gases collecting in the header 9 passes out through the condensate discharge just described thereby rendering unnecessary special venting of the drier to remove the air or non-condensible gases.

The escape of steam between the stationary steam inlet tube 35 and the distributing head 36 is prevented by a gland or stuffing box 57 and to this distributing head 36 is secured a cage 58 which is formed to provide a thrust bearing for a collar 59 welded to the steam pipe 35 so as to take the thrust of the steam pressure within the chamber 37.

The tubes 30 and 31 and pipes 39 are relatively long and are thereby preferably supported at one or more points to prevent them from being bent or distorted in use. For this purpose a U-bolt 60 having its legs secured to the cylindrical shell 5 embraces each corresponding pair of tubes 30 and 31 and a spacing block 61 is provided between each pair of pipes 30 and 31 and another spacing block 62 provided between each pipe 31 and the inside of the cylindrical shell 5. Similarly, legs or lugs 63 are preferably interposed between each of the pipes 39 and the inside of the tubes 31 through which they pass so as to prevent whipping of the pipes 39.

Steam entering through the steam pipes 33 and 35 is distributed in the chamber 37 to the two pipes 38 which conduct it directly to the steam pipes 39 which discharge the steam into the header 12 at the materials inlet end of the drier. In this header the steam is distributed to the two series of tubes 30 and 31 and flows back to the header 9 concurrent with the materials and sweeping the condensate and air or non-condensible gases along with it. In the header 9 the condensate is picked up by the partitions 45 and discharged into the elbows 48 and manifold 49 in which it is again picked up by the partitions 52 and discharged into the hub 50 and condensate outlet line 55. The air and other non-condensible gases also vent through the condensate outlet.

Figure 5:
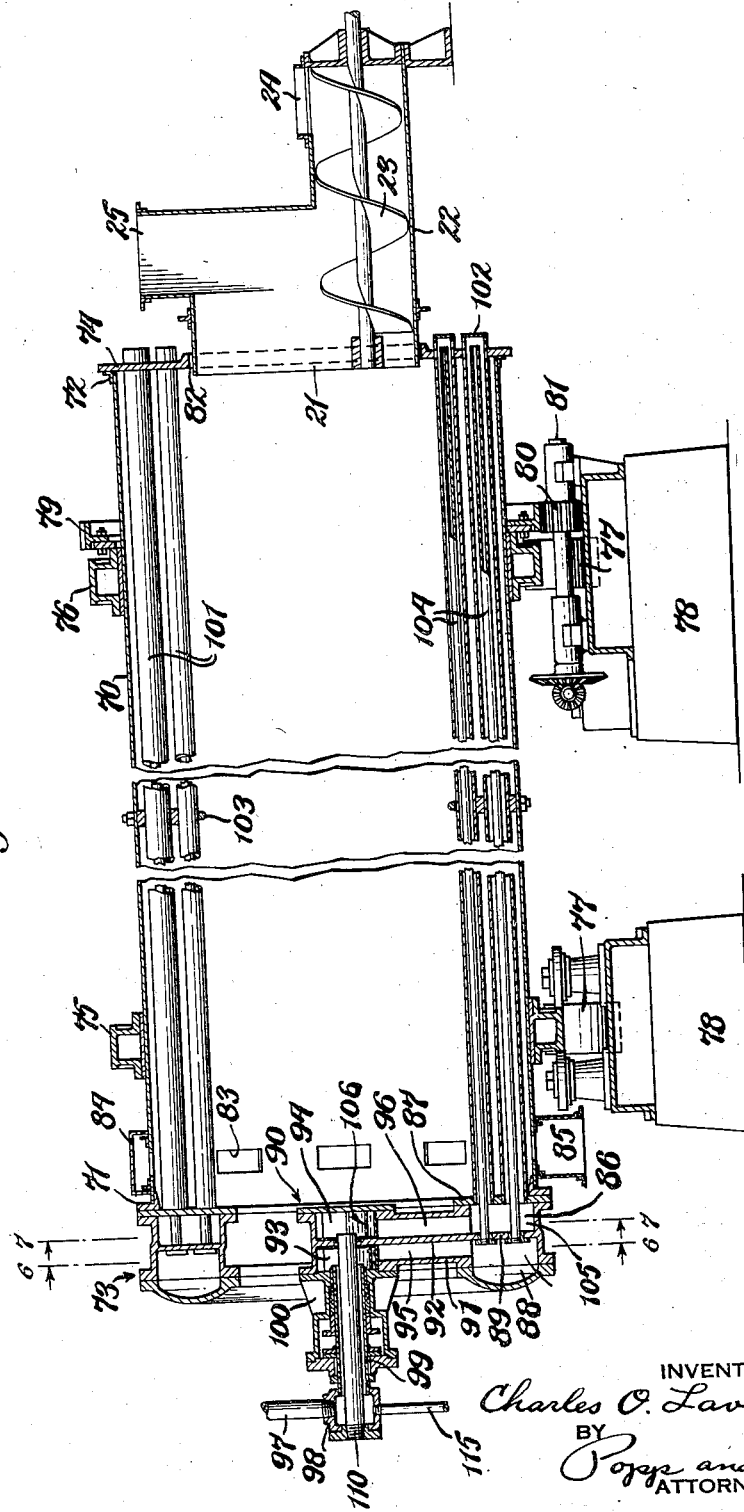
Fig. 5 is a view similar to Fig. 1 showing a modified form of my invention.

In the form of the invention illustrated in Figs. 5–7, the cylindrical shell 70 has flanged end rings 71 and 72 at its opposite ends, the flanged end ring 71 securing the shell to a header indicated generally at 73 and the flanged end ring 72 securing the shell to an annular end plate or head 74.

The shell is rotatably supported and for this purpose a pair of spaced annular tracks 75 and 76 are secured to the outside of the cylindrical shell and supported on rollers 77 mounted on a base 78. The shell is supported on an inclined axis, the plate 74 being higher than the head 73 and the shell is continuously rotated by means of a large ring gear 79 secured to the track 76 and driven by a pinion 80 on a shaft 81 which is journaled in suitable bearings mounted on the base 78. The shaft 81 can be turned in any suitable manner.

The plate or end head 74 is formed to provide a large central opening 82 through which the materials to be dried are introduced into the shell by means of a screw feeder having an outlet for the vapors generated by the drying process. This feeder is identical with that shown in connection with the drier illustrated in Figs. 1–4 and the same reference numerals have therefore been applied thereto. As in the form of the invention illustrated in Figs. 1–4, the opposite end of the shell 70 is provided with an annular row of outlet openings 83 through which the dried materials drop after traversing the length of the shell. The material so discharged through the openings 83 is collected in an annular trough 84 which embraces the shell 70 and is formed at its lower end with an outlet 85 for the dried materials. The trough 84 extends completely around the shell 70.

The header 73 is of annular form and is formed to provide an annular exhaust or outlet chamber 86 having a tube sheet 87 and an annular steam inlet chamber 88, the tube sheet 89 of which also forms one wall of the exhaust or outlet chamber 86. The header 73 is also formed to provide a hub 90 which is connected with the outer annular portion of the header by a plurality of hollow spokes 91. These spokes form the conduits for conducting the steam to the steam inlet chamber 88 and removing the condensate from the exhaust chamber 86 and for this purpose the tube sheet 89 separating the chamber 86 from the chamber 88 is continued to form a partition 92 extending along each spoke and across the interior of the hub 90 thereby to provide a steam inlet chamber 93 and a condensate outlet chamber 94 in the hub 90 and a steam passage 95 and a condensate discharge passage 96 along each spoke 91.

Steam is supplied to the steam chamber 93 and thence through the radiating passages 95 to the annular steam chamber 88 from a stationary steam pipe 97 which connects with a fitting 98, this fitting 98 being coaxial with the shell of the drier and conducting the steam to a coaxial tube 99 which is welded to the fitting 98 and journaled in a head 100 which is suitably secured to the hub 90, this steam tube 99 discharging into the steam inlet chamber 93.

A plurality of heating tubes 101 are secured at one end to the tube sheet 87, these tubes being preferably provided in concentric annular rows. These tubes 101 open into the annular outlet or exhaust chamber 86, the other end of each tube being closed or sealed, as indicated at 102 and being supported in the annular plate or head 74, as best shown in Fig. 5. These heating tubes 101 therefore extend the full length of the shell 70 and to prevent the tubes from being bent or distorted while in use, they are preferably supported at one or more points. For this purpose a U-bolt 103 having its legs secured to the shell 70 embraces each corresponding pair of tubes of the inner and outer concentric rows and spacing blocks are provided between the tubes of each pair and between each outer tube and the shell 70.

These heating tubes 101 are supplied with steam at their closed ends so that the flow of steam and materials is concurrent. For this purpose a steam supply pipe 104 is housed within each tube 101 and has an open end discharging against the seal 102 at its end. The other ends of the steam supply pipes 104 connect with the tube sheet 89 and open into the steam supply chamber 88.

In order to expel the condensate from the annular return or condensate chamber 86, radial partitions 105 extend across this chamber and lead to the passages 96 in the spokes, these partitions being disposed on a level with the bottom of the passages 96 on the rising side of the shell so that any accumulated condensate is dumped into the passages 96 as they successively rise above the horizontal and flows down to the chamber 94.

The condensate so discharged into the chamber 94 is picked up by a novel spiral condensate discharge head forming a feature of my invention. This spiral condensate discharge head, indicated generally at 106, is best illustrated in Figs. 8 and 9 and preferably consists of a casting including a circular end plate 107 from which a plurality of spiral vanes 108 project laterally, these vanes extending parallel with the axis of the head. The end plate is provided with a central hole 109. The spiral head 106 fits into the chamber 94 with its end plate against the partition 92, and discharges condensate into the open end of an axial condensate discharge pipe 110 which extends through the partition 92 and also through the hole 109. This condensate discharge pipe extends through the steam supply pipe 99 and fitting 98. It will be seen that as the spiral head 106 rotates with the drier, the condensate dumped into the hub chamber 94 by the spokes 91 is picked up by the spiral vanes 108 and lifted to the condensate discharge pipe 110 into which it is dumped.

In the event that any of the steam condenses and collects in the annular steam inlet chamber 88, a similar arrangement is provided for expelling it therefrom. Radial partitions 111, similar to the partitions 105, extend across the annular chamber 88 and on rising dump the condensate into the steam distributing passages 95 in the spokes, from which it flows down to the steam inlet chamber 93.

In this chamber is disposed a spiral condensate discharge head, indicated generally at 112. This head is essentially the same as the condensate discharge head 106 having an end plate 113 arranged against the partition 92 and spiral vanes 114 which lift the condensate dumped into the chamber 93 and discharge it into the steam inlet pipe 99. The condensate flows back through this steam pipe 99 and out through a condensate drain 115. It will be noted that the vanes 114 of the spiral condensate head 112 do not interfere with the distribution of steam to the passages 95 in the spokes 91.

It will be seen that with the form of the invention illustrated in Figs. 5–7, the steam from the supply pipe 97 passes through the fitting 98 and tube 99 into the chamber 93 of the hub 90. From this chamber the steam is distributed through the passages 95 of the three spokes 91 to the annular header space 88 from which it is distributed to the steam pipes 104. These pipes conduct the steam to the far or closed ends of the heating tubes 101 through which the steam flows concurrent with the drying materials and is condensed. The condensate flows into the annular return header space 86, is picked up by the partitions 105 and dumped into the passages 96 of the spokes 91 and in the hub the condensate is picked up by the spiral vanes 108 and discharged into the condensate outlet tube 110. Any condensate forming prior to the discharge of the steam into the heating tubes 101 flows back to the header space 88, is picked up by the partitions 111 and dumped into the steam distributing passages 95 of the spokes 91 and in the hub 90 is lifted by the spiral vanes 114 and discharged into the steam pipe 99 which conducts it to the condensate discharge 115. Any non-condensible gases are swept by the steam back to the header space 86 from which it can be easily vented, thereby avoiding the difficulty, heretofore present, of separately venting the heating tubes at the ends remote from the steam supply.

It is therefore apparent that in both forms of the invention there is no tendency for air or other non-condensible gases to collect in the upper ends of the heating tubes, these being instead swept back concurrent with the flow of materials to a place where they can be conveniently removed. Further it will be seen that the spiral condensate discharge heads 106 and 112 insure the continuous discharge of the condensate without interfering with the passage of steam.

I claim as my invention:—

1. A tubular rotary drier, comprising a rotary shell having end heads, each of which is formed to provide an annular header, an annular series of tubes in said shell connecting said headers, said series of tubes being spaced from the axis of said shell so as to provide a relatively large, unobstructed central passage through said shell, a steam pipe connected at one end to one of said headers and extending through the center of one of said tubes to the opposite header to discharge steam therein for distribution to said tubes, an external steam conduit extending radially outward from the axis of said shell and supplying steam to said steam pipe, means for removing the condensate from the header having said steam pipe connection whereby the flow of steam, condensate and non-condensible gases through said tubes is concurrent and means for admitting the materials to be dried into said shell and removing the dried materials therefrom.

2. A tubular rotary drier, comprising a rotary shell having end heads each of which is formed to provide an annular header, an annular series of tubes in said shell connecting said headers, said series of tubes being spaced from the axis of said shell so as to provide a relatively large, unobstructed central passage through said shell, a steam pipe arranged parallel with the axis of said shell and extending through the opposite walls of one of said headers and extending through the center of one of said tubes to the opposite header to discharge steam therein for distribution to said tubes, an external steam conduit extending radially outward from the axis of said shell and supplying steam to said steam pipe, means for introducing the materials to be dried through the head forming said steam distribution header, means for removing the dried materials from the end of said shell opposite the head through which the materials are introduced whereby the flow of materials and the flow of steam, condensate and non-condensible gases through said tubes is concurrent and means for removing the condensate from the header having said steam pipe connection.

3. A tubular rotary drier, comprising a shell rotating about an axis inclined relative to the horizontal, end heads at each end of said shell and each formed to provide an annular header, an annular series of tubes in said shell and connecting said headers, said series of tubes being spaced from the axis of said shell so as to provide a relatively large, unobstructed central passage through said shell, means for introducing the materials to be dried and discharging the vapors generated during drying through an opening in the upper end head, said shell having a discharge opening at its lower end for discharging the dried materials therefrom, a hollow head forming a steam chamber secured to said lower end head, a steam conduit coaxial with said shell and supplying steam to said chamber, an external steam pipe leading radially from said chamber to a point near said lower header and thence parallel with the axis of the shell through the opposite walls of the lower header and through one of said tubes to the interior of the upper header for discharging steam therein for distribution to said tubes, the flow of materials through said shell and the flow of steam, condensate and non-condensible gases through said tubes being thereby concurrent, a second, hollow head carried by said lower end head and forming a condensate chamber, means for discharging the condensate from said lower header into said condensate chamber and a condensate outlet conduit coaxial with said shell and draining said condensate chamber.

4. A tubular rotary drier, comprising a shell rotating about an axis inclined relative to the horizontal, end heads at each end of said shell and each formed to provide an annular header and a tube sheet, a plurality of tubes in said shell and connecting said tube sheets, means for introducing the materials to be dried and discharging the vapors generated during drying through an opening in the upper end head, said shell having a discharge opening at its lower end for discharging the dried materials therefrom, a hollow head secured centrally to the outside face of said lower tube sheet and forming a steam chamber, a stationary steam supply pipe coaxial with said shell and journaled in said hollow head and supplying steam to said steam chamber, a steam pipe leading from said chamber and extending through the adjacent header and through one of the tubes to the interior of the upper header for discharging steam therein for distribution to said tubes, the flow of materials through said shell and the flow of steam, condensate and non-condensible gases through said tubes being thereby concurrent, a second hollow head secured centrally to the inside face of the lower tube sheet and forming a condensate chamber, a condensate pipe connecting said lower header and said second hollow head, a partition in said lower header for discharging the condensate into said condensate pipe, a stationary condensate discharge pipe coaxial with said shell and journalled in said second hollow head and a partition in said condensate chamber for discharging the condensate into said condensate discharge pipe.

5. A rotary drier comprising a rotary end head rotating about a generally horizontal axis and formed to provide an annular header and a tube sheet, a plurality of tubes extending outwardly from said tube sheet, means for admitting steam to said tubes and means for removing the condensate from said header, comprising a hollow head rotating with said header and arranged coaxially therewith and forming a condensate chamber, a condensate pipe connecting said header with said hollow head, a partition in said header for discharging the condensate into said condensate pipe, a stationary condensate pipe coaxial with said shell and journaled in said hollow head and a partition in said condensate chamber for discharging the condensate into said condensate discharge pipe.

6. A rotary drier comprising a rotary end head rotating about a generally horizontal axis and formed to provide an annular header and a tube sheet, a plurality of tubes extending outwardly from said tube sheet parallel with the axis of said end head, means for admitting steam to the ends of said tubes remote from said tube sheet and means for removing the condensate from said header, comprising a hollow head secured centrally to said tube sheet and forming a condensate chamber, a condensate pipe connecting said header with said hollow head, a partition in said header for discharging the condensate into said condensate pipe, a stationary condensate pipe coaxial with said shell and journaled in said hollow head and a partition in said condensate chamber for discharging the condensate into said condensate discharge pipe.

7. A tubular rotary drier, comprising a shell rotating about a generally horizontal axis, an end head at one end of said shell and formed to provide an annular header and a tube sheet, a plurality of tubes in said shell connecting with said tube sheet, a hollow head secured centrally to the outside face of said tube sheet and forming a steam chamber, a stationary steam supply pipe coaxial with said shell and journaled in said hollow head and supplying steam to said steam chamber, means for conducting the steam from said chamber to the ends of said tubes remote from said tube sheet, means for admitting the materials to be dried to said shell at the end remote from said end head whereby the flow of materials through said shell is concurrent with the flow of steam and condensate through said tubes, a second hollow head secured centrally to the inside face of said tube sheet and forming a condensate chamber, a condensate pipe connecting said header and said second hollow head, a partition in said header for discharging the condensate into said condensate pipe, a stationary condensate discharge pipe coaxial with said shell and journaled in said second hollow head and a partition in said condensate chamber for discharging the condensate into said condensate discharge pipe.

CHARLES O. LAVETT.